May 31, 1927.
S. FUTERMAN
1,630,933
TRUSS FOR RUPTURE
Filed Sept. 17, 1926
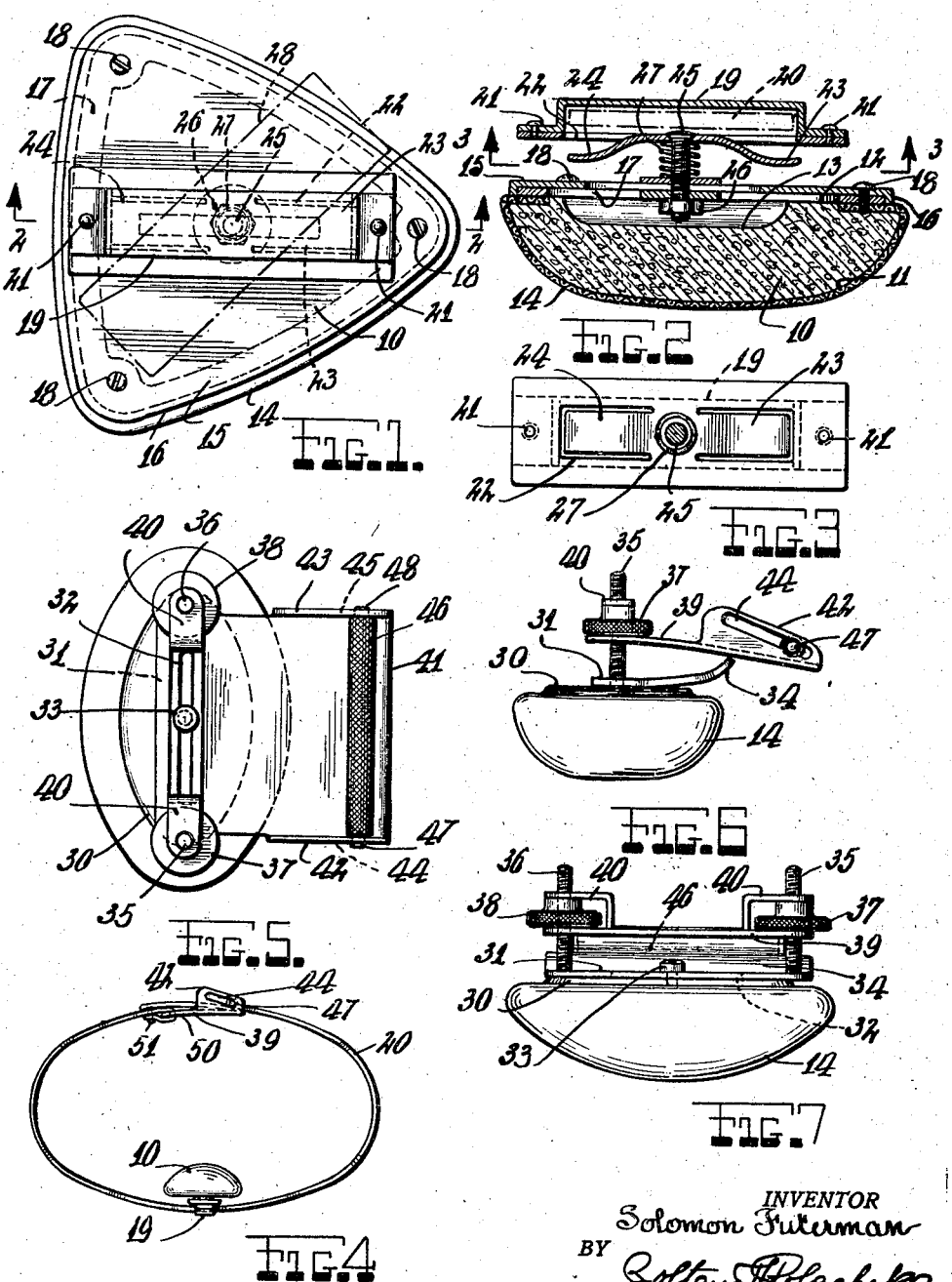
INVENTOR
Solomon Futerman
BY
Zoltan H. Polachek
ATTORNEY Patented May 31, 1927.

1,630,933

UNITED STATES PATENT OFFICE.

SOLOMON FUTERMAN, OF BROOKLYN, NEW YORK.

TRUSS FOR RUPTURE.

Application filed September 17, 1926. Serial No. 136,021.

My invention relates to improvements in trusses for rupture or hernia and the general objects of my invention are to improve and simplify the construction to render the said device more comfortable in use.

More specific objects are to provide an improved form of truss-pad to be used as a protection to prevent rupture and a help for ruptured persons.

For further comprehension of the invention, and of the objects and advantages thereof, reference will be had to the following description and accompanying drawings, and to the appended claims in which the various novel features of the invention are more particularly set forth.

Fig. 1 of the drawings, is a top plan view of the truss-pad as used in combination with my improved device.

Fig. 2 is a sectional view thereof, taken on the line 2—2 of Fig. 1.

Fig. 3 is a sectional view, taken on the line 3—3 of Fig. 2.

Fig. 4 is a top plan view of my improved truss, as same would appear when in use.

Fig. 5 is a top plan view, illustrating a modification of the truss-pad.

Fig. 6 is a side elevational view thereof.

Fig. 7 is a front elevational view thereof.

As here embodied my improved device comprises a truss-pad consisting of a pad member 10, preferably of cork, and having a convex or rounded surface 11, and a flat surface 12 provided with an opening 13. The convex surface 11 is covered with a pliable member 14, preferably with cloth or the like, which is stretched over the said convex surface, and is of suitable size to extend over the outer edges of the flat surface 12. The retaining plate 15, is adapted to retain the pliable member 14 in place, and is provided with an extended portion 16, at its periphery, adapted to receive the attaching plate 17, which is of suitable size to engage in the retaining plate 15. The retaining plate 15, the attaching plate 17, and the pliable member 14, are removably attached to the pad member 10, by threaded members 18, screws or the like; the above described construction being such as will firmly hold the latter mentioned elements in place.

The inner belt member 19 is formed or bent, so as to provide an opening for the belt 20, and is attached at its extremities, as at 21, by rivets or the like, to the outer belt member 22; the belt 20 being engaged between the inner belt member 19 and the outer belt member 22, which is adapted to encircle the waist of the wearer, so as to permit the convex surface 11 of the truss-pad to be placed over the ruptured portion of the wearer. The outer belt member 22, has formed therein, and extended therefrom, curved elements 23 and 24, oppositely positioned from the center of the said outer belt member, so as to form springs, and which may be tempered, as may be desired to secure the resilient usefulness of an ordinary flat spring.

The outer belt member 22 is provided with a center aperture adapted to receive the threaded member 25, a bolt, machine screw or the like, which is extended through a similar aperture provided in the retaining plate 15. The bolt 25 has threadedly attached thereto a nut 26, as a means of attaching the said inner and outer belt members to the truss-pad. The compression spring 27, is wound on the bolt 25 and is superimposed between the retaining plate 15 and the outer belt member 22, the above described construction being such as will permit the spring 27 and the spring elements 23 and 24 of the outer belt member 22, to force the truss-pad against the ruptured portion of the wearer; it being understood that my improved truss-pad may be of any desired shape or contour, and that the said truss-pad may be placed at any desired relative position to the said belt members, as designated by the reference numeral 28, Fig. 1 of the accompanying drawings, by pivoting the truss-pad on the bolt 25.

Referring in particular to Figs. 5, 6 and 7, in which I have illustrated a modification of the truss-pad, as used in combination with my improved device, and in which the said pliable member 14 is attached to the above mentioned outer edge of the flat surface of the said truss-pad, by a plate member 30, secured to the truss-pad by, bolts, screws, or the like. The flat member 31 is provided with a longitudinal elongated slot 32, adapted to receive the screw 33 or the like, as a means of attaching the flat member 31 to the said truss-pad, so as to permit the truss-pad to be positioned in any desired relative angular position thereto. The flat member 31 is provided with an extended portion 34, formed or bent outwardly from the truss-pad, and which may be tempered, as may be desired to secure a resilient usefulness of an ordinary flat spring. The threaded members 35 and 36, are attached at or near the extremities of the flat member 31, and extend upwardly therefrom. The set screws 37 and 38, are threadedly attached to the threaded members 35 and 36, respectively, and are positioned between the attaching member 39, and the upper extended elements 40, of the attaching member 39, so as to prevent the said set screws 37 and 38 from being disengaged from the threaded members 35 and 36, when in use; the above described construction being such as will permit the attaching member 39 to be engaged with the spring element 34, as may be desired, by turning or rotating the set screws 37 and 38, so as to increase or decrease the pressure applied on the ruptured portion by the said truss-pad. The attaching member 39 is provided with an extended portion 41, having its sides formed or bent upwardly therefrom, at right angles thereto, as at 42, and 43, and which are provided with elongated slots 44 and 45, respectively, at an angular position to the said extended portion 41 of the attaching member 39. The roller 46, having a knurled or roughened surface, is provided with projecting extremities 47 and 48, adapted to slidably engage in the elongated slots 44 and 45. The latter described construction being such as will permit the roller 46, to slidably and frictionally engage the belt to which my improved truss-pad is attached, and which is positioned under the said roller, so as to hold the said truss-pad in any desired position on the said belt.

It will be further understood that I may use a buckle, such as illustrated in Fig. 4 of the accompanying drawings, and which is of similar construction to the above described attaching member 39, and is provided with an elongated slot 50, adapted to receive one extremity of the hereinbefore mentioned belt 20, which is engaged through the elongated slot 50, and riveted, or otherwise attached, as at 51, to the belt proper; the above described construction being such as will securely hold the belt, used to support my improved truss-pad, in place on the waist of the wearer.

Having thus described my invention, what I claim as new and desire to secure by Letters Patent of the United States is as follows:

1. In a truss, the combination with a truss-pad, of a flat member adjustably securable thereto, an extended portion from the flat member being bent outwardly from the truss-pad, threaded members extending upwardly from the flat member, an attaching member having upper extended elements, set screws positioned between the attaching member and the upper extended elements, and threadedly engaged to the threaded members, and means associated with the attaching member for engaging a belt customarily used with truss devices.

2. In a truss, the combination with a truss-pad, of a flat member adjustably securable thereto, an extended portion from the flat member being bent outwardly from the truss-pad, threaded members extending upwardly from the flat member, an attaching member having upper extended elements, set screws positioned between the attaching member and the upper extended elements, and threadedly engaged to the threaded members, and means associated with the attaching member for engaging a belt customarily used with truss devices, said means consisting of a portion extended from the attaching member, sides bent upwardly therefrom, and at right angles thereto, the said sides being provided with elongated slots in an angular position to the extended portion, and a roller with a knurled surface slidably engaged in the elongated slots.

In testimony whereof I have affixed my signature.

SOLOMON FUTERMAN.